United States Patent
Hong et al.

(10) Patent No.: US 7,148,878 B2
(45) Date of Patent: Dec. 12, 2006

(54) METHOD AND APPARATUS FOR BIOMETRIC CONTROL OF DISPLAY INDICATOR

(75) Inventors: Di-An Hong, Inverness, IL (US); Swee Mean Mok, Schaumburg, IL (US); Tom Mathew, Skokie, IL (US)

(73) Assignee: Motorola, Inc., Schaumburg, IL (US)

( * ) Notice: Subject to any disclaimer, the term of this patent is extended or adjusted under 35 U.S.C. 154(b) by 727 days.

(21) Appl. No.: 10/016,699

(22) Filed: Dec. 10, 2001

(65) Prior Publication Data

US 2003/0107608 A1    Jun. 12, 2003

(51) Int. Cl.
   *G09G 5/08*    (2006.01)
(52) U.S. Cl. .................. 345/157; 345/158; 345/159
(58) Field of Classification Search ........ 345/156–163, 345/863, 168, 169, 173, 700, 7–8; 600/505; 715/700–702
   See application file for complete search history.

(56) References Cited

U.S. PATENT DOCUMENTS

| | | | |
|---|---|---|---|
| 4,030,141 A | | 6/1977 | Graupe |
| 4,209,860 A | | 7/1980 | Graupe |
| 5,062,857 A | | 11/1991 | Berringer et al. |
| 5,230,025 A | | 7/1993 | Fishbine et al. |
| 5,429,006 A | | 7/1995 | Tamori |
| 5,473,144 A | | 12/1995 | Mathurin, Jr. |
| 5,491,492 A | * | 2/1996 | Knapp et al. ................. 345/8 |
| 5,599,391 A | | 2/1997 | Lee |
| 5,603,179 A | | 2/1997 | Adams |
| 5,613,712 A | | 3/1997 | Jeffers |
| 5,625,448 A | | 4/1997 | Ranalli et al. |
| 5,668,874 A | | 9/1997 | Kristol et al. |
| 6,040,821 A | * | 3/2000 | Franz et al. ................. 345/159 |
| 6,088,471 A | | 7/2000 | Setlak et al. |
| 6,148,094 A | | 11/2000 | Kinsella |
| 6,413,190 B1 | * | 7/2002 | Wood et al. ................. 482/8 |
| 6,473,070 B1 | * | 10/2002 | Mishra et al. ............. 345/158 |
| 6,504,526 B1 | | 1/2003 | Mauritz |
| 2002/0143277 A1 | * | 10/2002 | Wood et al. ................. 600/595 |

FOREIGN PATENT DOCUMENTS

GB    0468340 A2 *    1/1992

OTHER PUBLICATIONS

Tetsuya Itou et al. "Mouse cursor control system using EMG" Oct. 2001, 2001 Proceedings of the 23rd Annual EMBS International Conference, Oct. 25-28, Istanbul, Turkey pp. 1368-1369.*

Armando B. Barreto et al. "A practical EMG-based human-computer interface for users with motor disabilities" Journal of Rehabilitation Research and Development vol. 37 No. 1, Jan./Feb. 2000 pp. 1-12.*

Margaret Quan, EE Times: *"Fingerprint Sensor Looks to Tap Security Applications"*; http://www.techweb.com/wire/story/TWB19981004S000 Oct. 4, 1998.

(Continued)

*Primary Examiner*—Xiao Wu

(57) ABSTRACT

Biometric sensors such as electromyographic sensors 21A and 21B sense muscle flexing. The resultant signals are sensed 11 and utilized to establish 13 a corresponding angle of movement and to establish 15 magnitude of movement for an on-screen display indicator such as an on-screen cursor 61. In one embodiment, the electromyographic sensor signals are shifted and scaled 31. Wireless transmissions can be utilized to increase portability of the sensor interface.

15 Claims, 3 Drawing Sheets

OTHER PUBLICATIONS http://www.verdicom.com/technology/how; published prior to Nov. 13, 2001.

AF-S2 FingerLoc Advertisement; published prior to Nov. 13, 2001.

AuthenTec.Inc web page; http://www.authentec.com/about/technology2; published prior to Nov. 13, 2001.

Enix Corp., FS Project, Marketing Div. Advertisement; published prior to Apr. 17, 2000.

Atmel Brochure; Jan. 2000.

Jim Carlton, The Wall Street Journal; "*A Technology to Make Passwords a Thing of the Past*" Nov. 12, 1998.

Fujitsu Japanese Release; "*Fujitsu Introduces FingerPass Card, a PC Card-Based Fingerprint Recognition Device for Mobile PCs*" Aug. 19, 1998.

Kim Komando, Los Angeles Times; "*Protect Your PC with Just a Fingertip*" Published 1998.

Motorola Web Page, "*Motorola, Identix Announce New Biometric Fingerprint Reader Which Sets New Industry Standards for Size, Security and Cost*" Nov. 30, 1999.

Dr. Matthew Holloway, Luana Scully and Mary Ward, HDI; "*Anisotropically Conductive Materials for Direct Chip Attach*" Feb. 2000.

Haug et al., IEEE Transactions on Electronics Packaging Manufacturing, vol. 23, No. 1; "*Low-Cost Direct Chip Attach: Comparison of SMD Compatible FC Soldering with Anisotropically Conductive Adhesive FC Bonding*" Jan. 2000.

Fu et al., IEEE Transactions on Electronics Packaging Manufacturing, vol. 23, No. I; "*Experimental and Theoretical Characterization of Electrical Contact in Anisotropically Conductive Adhesive*" Feb. 2000.

\* cited by examiner

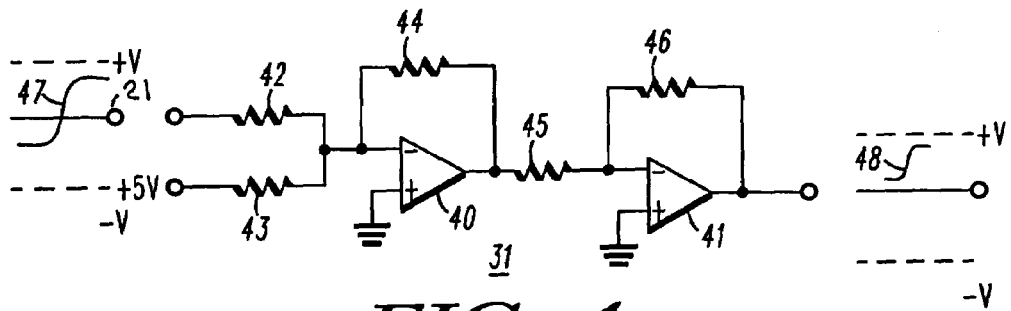
FIG. 4
FIG. 5
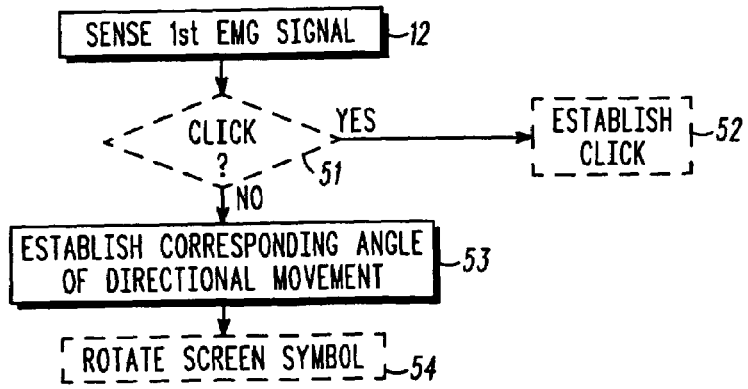

US 7,148,878 B2

METHOD AND APPARATUS FOR BIOMETRIC CONTROL OF DISPLAY INDICATOR

TECHNICAL FIELD

This invention relates generally to control of display indicators and more particularly to biometric control of display indicators such as on-screen cursors.

BACKGROUND

Display indicators such as on-screen cursors are well known and understood in the art. Such indicators serve to highlight an on-screen element or otherwise identify a screen area where additional actions are intended. Such display indicators are usually manipulated by a mouse, touchpad, arrow keys, trackball and the like. Such devices also usually have one or more control surfaces that can be asserted to thereby provide a selection signal that corresponds to the present display indicator position (such functionality is usually referred to as a "click" and often includes both a so-called "left click" and a "right click").

Unfortunately, not all potential users are able to usefully (or easily) manipulate such display indicator devices. For example, some potential users have physical infirmities (including partially or wholly missing or less than fully functional digits or limbs) that preclude full use of such devices. To meet this need, biometrics have been suggested as a way to facilitate user control of a display indicator. While existing biometric solutions have provided a satisfactory interface for some users, however, problems remain. For example, many biometric solutions are not suitable for all such potential users. And even when conceptually suitable, many such solutions are unduly complicated and too expensive for many potential users (for example, many biometric solutions seeking to provide X-Y control of a display indicator requires at least four separate biometric sensors). Beyond this, many prior art biometric solutions lack portability and further often require a significant amount of user training.

Consequently, a need still exists for a biometric solution to display indicator control that avoids at least some of these problems.

BRIEF DESCRIPTION OF THE DRAWINGS

This need and others are substantially met through provision of the method and apparatus for biometric control of a display indicator as disclosed herein.

These and other benefits will become more evident upon making a thorough review and study of the following detailed description, particularly when reviewed in conjunction with the drawings, wherein:

FIG. 4 comprises a schematic depiction of a voltage shifting and scaling unit as configured in accordance with the invention;

FIG. 5 comprises a detailed flow diagram depicting an embodiment configured in accordance with the invention;

DETAILED DESCRIPTION

Pursuant to the teachings herein, an apparatus is provided having a first and second biometric signal input. These signals are provided to a signal translator that translates these signals to provide angular direction of movement information and magnitude of movement information for a display indicator. Pursuant to one embodiment, a first biometric signal, such as an electromyogram signal, is sensed and utilized to establish the angle of directional movement information for an on-screen cursor. A second biometric signal, again such as an electromyogram signal, is sensed and utilized to establish movement of the on-screen cursor in a previously determined direction. Such an apparatus and method can be implemented with only two biometric sensors. By relying upon electromyogram signals, the sensors can be placed on any activatable muscle (even if that muscle is not fully capable). Because so few sensors are required and because the sensors can be placed on any at least somewhat workable muscle, this approach can be used for virtually all potential users.

Figure 1:
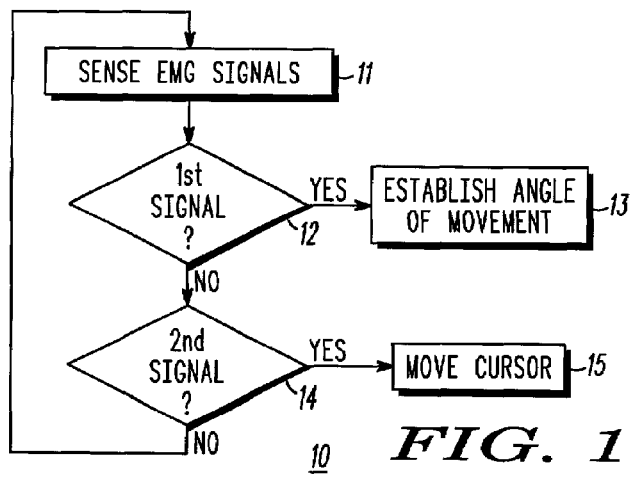
FIG. 1 comprises a flow diagram depicting an embodiment configured in accordance with the invention.

Referring now to FIG. 1, in one embodiment 10 electromyogram signals are sensed 11. When a first electromyogram signal is sensed 12, the angle of movement for a display indicator is established 13. When a second electromyogram signal is sensed 14, that display indicator can be moved 15. Additional details and alternative embodiments will be provided below.

Figure 2:
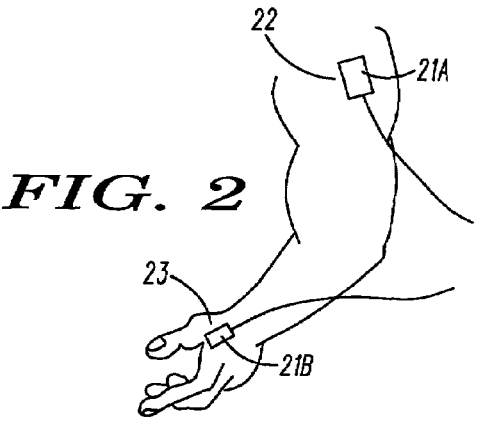
FIG. 2 comprises a view of a human arm having biometric sensors attached thereto.

Electromyogram signals are a well understood phenomenon of muscle tissue. When a given muscle contracts, a small corresponding electrical signal occurs. Such a signal can be detected by an electromyogram sensor as well understood in the art. Such sensors typically provide an output voltage that corresponds to the strength of the musculature electrical signal. Electromyogram sensors will provide signals of varying maximum magnitudes when placed in contact with virtually any muscle. Such sensors are also simple to use; they are relatively small and can be held in place with simple adhesive devices such as double sided tape. In FIG. 2 a first electromyogram sensor 21A is shown as positioned to sense a shoulder muscle 22 and a second electromyogram sensor 21B is shown as positioned to sense a hand muscle 23. Such positioning will be presumed for the remainder of this detailed description, but it should be understood that virtually any muscle could be used, including muscles on the face, torso, and legs. Appropriate muscles as are available to a given potential user should be selected on an individual basis.

Figure 3:
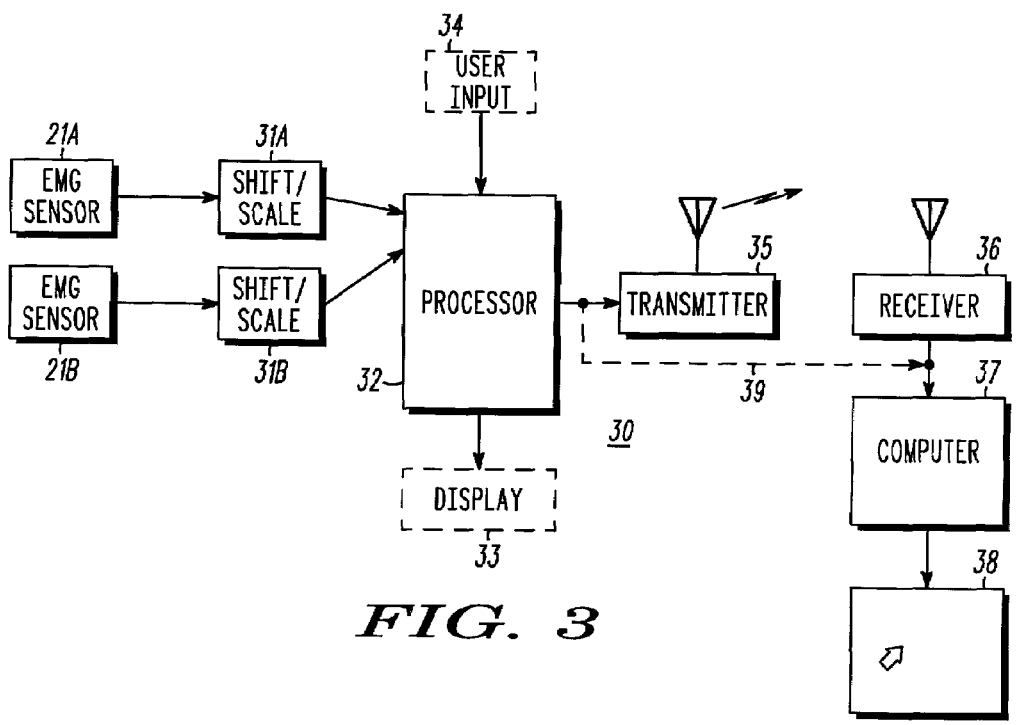
FIG. 3 comprises a block diagram depiction of various embodiments configured in accordance with the invention.

An overall system 30 as depicted in FIG. 3 includes a processor 32 that functions in this embodiment as a signal translator and that couples to the two electromyogram sensors 21A and 21B. The processor 32 can be, for example, an HC11 family device as offered by Motorola, Inc. The electromyogram sensors 21A and 21B couple to analog to digital inputs of the processor 32 through voltage shifting and scaling units 31A and 31B (additional detailed regarding these units will be provided below). If desired, the processor 32 can couple to a local output device such as a display 33. In addition, and again if desired, a user input mechanism 34 can also couple to the processor 32 (for example, the user input 34 can include a reset button, one or more translation sensitivity controls, and so forth). The processor 32 also couples to a radio frequency transmitter 35 (this coupling can be effected, for example, using an RS232 interface and protocol).

So configured, the processor 32 can receive electromyogram signals from the two electromyogram sensors 21A and 21B. These signals can be sensed and translated as described earlier to establish angle of movement information and magnitude of movement information for a display indicator such as an on-screen cursor. The latter information can then be transmitted by the transmitter 35.

A receiver 36 receives the information as transmitted by the transmitter 35. The receiver 36 couples to a computer 37 (this coupling can be effected, for example, using a keyboard/mouse serial interface and protocol). The computer 37 can be any appropriate computational platform but most typically will be a standard personal computer. The computer 37 couples to and drives a display 38 such as a cathode ray tube display or other display platform such as a flat panel display.

So configured, the receiver 36 can receive the display indicator movement information as transmitted by the transmitter 35 and provide this information to the computer 37 to effect movement of a display indicator such as an on-screen cursor on the display 38.

The above described embodiment provides for a wireless transmission of information to the computer 37. If desired, of course, a wired path 39 could be utilized instead. Also as described, the wireless path comprised a radio frequency based technology. If desired, of course, other wireless technologies could be utilized instead, including, for example, infrared communications.

With reference to FIG. 4 the shifting and scaling unit 31 as generally mentioned above will now be described in more detail. A pair of substantially identical parallel configured resistors 42 and 43 couple between the inverting input of a first op-amp 40 and, respectively, a corresponding electromyogram sensor 21 and a positive 5 V source. The output of this first op-amp 40 connects to a feedback resistor 44 and through a coupling resistor 45 to the inverting input of a second op-amp 41. The output of the second op-amp 41 connects to a feedback resistor 46 and to an output that couples to the processor 32 as described above.

So configured, electromyogram signal 47 as presented at the input of the unit 31 can range between a negative and positive voltage limit (in this case, −5 V and +5 V). The first stage shifts this signal 47 up by +5 V and scales the output of the first op-amp 40 by the ratio of the feedback resistor 44 for that op-amp 40 as divided by the input resistor 42. Presuming an input signal 47 having the upper and lower limits previously suggested, this ratio can be, for example, ½. As a result, an input signal 47 that ranges between −5 V and +5 V will result in an output signal 48 that, while proportionately identical to the input signal 47, will range only between 0 V and +5 V. The latter resultant range is compatible with the analog to digital conversion inputs of a processor 32 such as an HC11.

Additional description regarding operation regarding various embodiments will now be provided.

Referring to FIG. 5, upon sensing a first electromyogram signal 12 as described earlier, the processor 32 can optionally detect a "click" 51 (a click being the equivalent of a left and/or right click as can be asserted, for example, by a mouse or trackball controller). A click 51 can be detected by sensing, for example, a very short duration electromyogram signal. So configured, a user would only flex a monitored muscle very briefly to thereby create an electromyogram signal that would be detected as a click 51. Other schemes could be utilized as well, of course. For example, two quick successive muscle flexings could be required, or a short first flexing followed by a medium length second flexing. Many other approaches could be utilized as well, and the invention should not be viewed as being limited to any particular pattern or scheme. Upon detecting an electromyogram signal that is to be interpreted as a click 51, the processor 32 establishes 52 that a click has been asserted.

Figure 6:
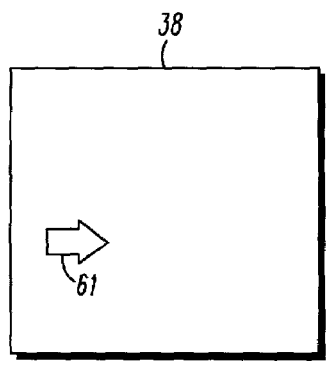
FIGS. 6 through 9 comprise views of a display indicator on a display.
Figure 7:
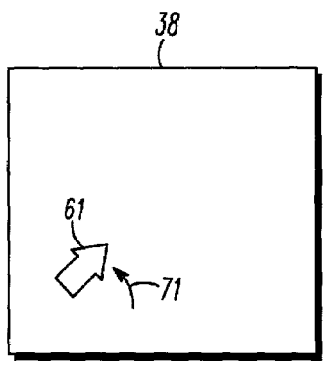

Otherwise, presuming either that a click 51 has not been detected or that no click detection has occurred, the electromyogram signal is utilized to establish 53 a corresponding angle of directional movement for the display indicator. This information can then be optionally used to rotate the corresponding screen symbol. For example, an on-screen cursor 61 may have a starting position and orientation as depicted in FIG. 6. Based upon the angle of directional movement as established 53 by the processor 32, the on-screen cursor 61 can be rotated 71 as depicted in FIG. 7. The amount of rotation 71 can comprise a function of the magnitude and/or duration of the electromyogram signal (and hence the magnitude and/or duration of the monitored muscle flexing). Rotation 71 of the on-screen cursor 61 can either be done after the signal has been fully processed or during processing of the signal. The latter approach has the advantage of being more real-time and providing substantially immediate visual feedback to the user. The latter advantages can facilitate both a shortened learning cycle and a potentially speedier user interface in use.

Figure 8:
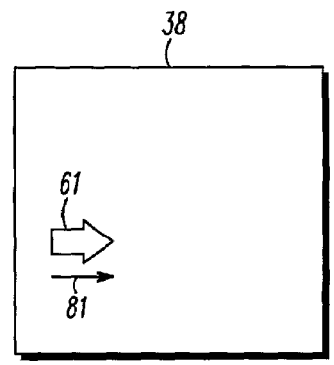
Figure 9:
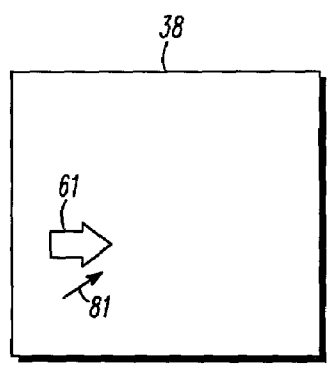

For some purposes, it may be inappropriate to rotate the on-screen cursor 61 in itself (this can be particularly true when the on-screen cursor 61 has no particular directional orientation itself that will usefully suggest to the user the resultant angle of directional movement). In such a situation, it may be appropriate to provide an on-screen directional indicator 81 in conjunction with the on-screen cursor 61 as depicted in FIG. 8. As shown in FIG. 9, this on-screen directional indicator 81 can be rotated as described above while leaving the on-screen cursor 61 in an unrotated state. Various on-screen directional indicators can of course be utilized and can be placed in various positions with respect to the on-screen cursor. All such variations should be considered as being within the scope of these teachings.

Figure 11:
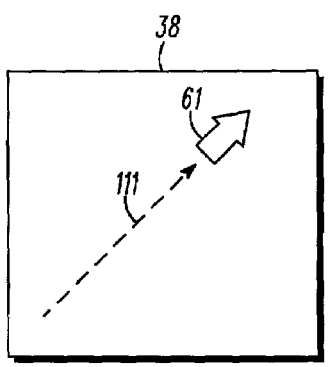
FIG. 11 comprises a view of a display indicator on a display.
Figure 10:
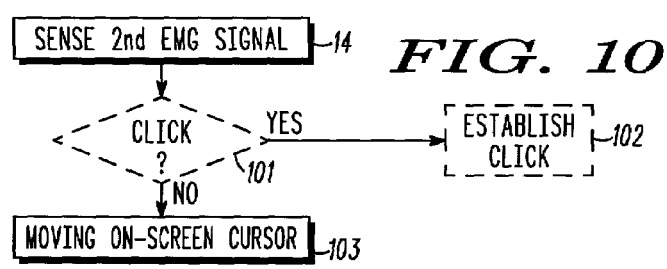
FIG. 10 comprises a detailed flow diagram depicting an embodiment configured in accordance with the invention.

Referring now to FIG. 10, upon sensing 14 the second electromyogram signal, again, optionally, a click assertion can be detected 101 and established 102 when detected. If desired, a click as detected 51 in conjunction with the first electromyogram signal can be translated as a left click and a click as detected 101 in conjunction with the second electromyogram signal can be translated as a right click. Other combinations and permutations are of course possible. Following this optional step, the processor 32 produces information to move 103 the display indicator (in this case, the on-screen cursor). For example, and with reference to FIG. 11, the on-screen cursor 61 can be moved 111 in accordance with the movement information generated 103 by the processor 32. Again, this movement information can be implemented during processing of the second electromyogram signal or following full receipt of the second electromyogram signal (and again, real-time processing offers the advantage of real-time visual feedback to the user). Also as before, the magnitude of movement can be made a function of the magnitude of the electromyogram signal, the duration of the electromyogram signal, or some combination thereof.

Other possibilities exist as well. For example, the distance of movement can be made a function of the duration of the electromyogram signal and the speed with which the display indicator moves can be made a function of the magnitude of the electromyogram signal. These and other similar alternatives should again be considered as being within the scope of these teachings.

Figure 12:
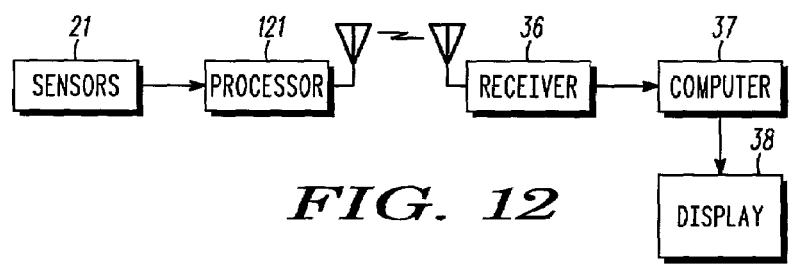
FIG. 12 comprises a block diagram depiction of various embodiments configured in accordance with the invention.

Referring now to FIG. 12, it should be understood and appreciated that the basic methodology as described above can be effected in a variety of ways. As described, the processor 121 receives the electromyogram signals and translates those signals into display indicator movement information. This movement information is then provided to a receiver 36 that converts the received movement information into an appropriate interface protocol that the computer 37 receives and utilizes as though it were, in fact, mouse movement information.

Alternatively, the processor 121 can function to receive the electromyogram signals and can further function to foreword digitized versions of those signals to the receiver 36. The receiver 36 can then be provided with the electromyogram signal translation capability described above to translate the electromyogram signals into corresponding display indicator movement information that is again provided to the computer 37 in an appropriate compatible format.

In yet another approach, the processor 121 can again serve to only foreword digitized versions of the electromyogram signals to the receiver 36 which then serves to provide those essentially raw signals to the computer 37. In this embodiment, the information would likely be provided to the computer through an RS232 port or other appropriate serial or parallel data input port. The computer 37 which then effect the translation processing to convert the electromyogram signals into the display indicator movement information.

It is also possible that the translation functionality could be distributed over two or more of these components as might be appropriate in a given context.

And, as mentioned earlier, in all of these embodiments a wired link as versus a wireless link could be utilized. Depending upon the capabilities of the computer 37, such a wired link could obviate the need for the receiver 36 altogether.

Although the physical location where the translation occurs can vary depending upon the embodiment, all such location possibilities should be viewed as being within these teachings.

By provision and practice of the above embodiments, a relatively simple, economical, effective, and easily learned mechanism for controlling an on-screen display indicator such as an on-screen cursor can be realized. Only two biometric sensors are required to achieve these results. Because virtually all at least somewhat operational muscles can be utilized to drive the sensors, this approach can be successfully utilized with virtually all potential users. Although various embodiments and specifics have been set forth, those skilled in the art will recognize that additional modifications, variations, and combinations can be readily made. Such modifications, variations, and combinations should be considered as being within the scope of the invention.

We claim:

1. A method for manipulating an on-screen cursor comprising:

sensing first electromyogram signals;

sensing second electromyogram signals;

in response to sensing at least some of the first electromyogram signals, establishing an angle of directional movement for the on-screen cursor;

in response to sensing at least some of the second electromyogram signals, moving the on-screen cursor in a previously determined direction.

2. The method of claim 1 wherein sensing first electromyogram signals includes sensing first electromyogram signals from at least a first muscle and wherein sensing the second electromyogram signals includes sensing second electromyogram signals from at least a second muscle, which second muscle is different from the first muscle.

3. The method of claim 1 wherein establishing an angle of directional movement for the on-screen cursor includes rotating an on-screen directional indicator that corresponds to the angle of directional movement.

4. The method of claim 3 wherein rotating an on-screen directional indicator that corresponds to the angle of directional movement includes rotating the on-screen cursor.

5. The method of claim 1 and further comprising wirelessly transmitting information signals that at least correspond to the first and second electromyogram signals.

6. The method of claim 1 and further comprising wirelessly transmitting information signals that at least correspond to the angle of directional movement for the on-screen cursor and movement of the on-screen cursor in a previously determined direction.

7. The method of claim 1 and further comprising processing the first and second electromyogram signals to at least level shift the first and second electromyogram signals.

8. The method of claim 1 and further comprising processing the first and second electromyogram signals to at least scale the first and second electromyogram signals.

9. The method of claim 1 and further comprising processing the first and second electromyogram signals to at least level shift and scale the first and second electromyogram signals.

10. The method of claim 1 and further comprising, in response to sensing at least one of the electromyogram signals, asserting a mouse click.

11. The method of claim 10 wherein asserting a mouse click includes asserting a mouse left click.

12. The method of claim 10 wherein asserting a mouse click includes asserting a mouse right click.

13. The method of claim 1 wherein sensing first electromyogram signals includes sensing first electromyogram signals that at least equal a predetermined threshold.

14. A method for manipulating an on-screen cursor comprising:

in response to receiving a first biometric signal, deriving corresponding angular direction of movement information for the on-screen cursor;

in response to receiving a second biometric signal, deriving corresponding magnitude of movement information for the on-screen cursor.

15. The method of claim 14 and further comprising, in response to receiving at least one of the first and second biometric signals, deriving a corresponding mouse click assertion.

* * * * *